Oct. 9, 1951 P. MARCEROU 2,570,700
PORTABLE MECHANICAL SAW
Filed May 14, 1949
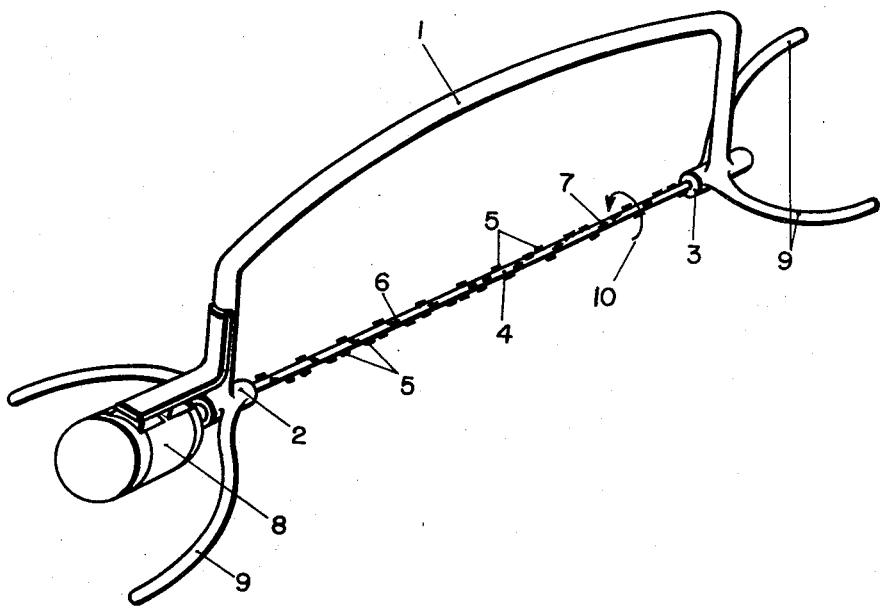

Patented Oct. 9, 1951

2,570,700

UNITED STATES PATENT OFFICE 2,570,700

PORTABLE MECHANICAL SAW

Paul Marcerou, Paris, France

Application May 14, 1949, Serial No. 93,222
In France May 12, 1948

7 Claims. (Cl. 125—13)

My invention relates to a portable mechanical saw intended chiefly but not exclusively for the cutting of stone and the like material.

The saw according to my invention includes a portable support in which is rotatably carried a tool the axis of rotation of which is parallel to the cut that is to be made.

According to a further feature of my invention, the operative edge of the rotary tool that may be continuous or constituted by a series of spaced separate abrading members arranged along two non-intersecting helical lines of equal length, the pitches of said lines being equal but of opposite directions.

According to a still further feature of the invention, the rotation of the rotary tool causes the stone or the like fragments to be removed towards the two ends of the tool by reason of the helical arrangement given to the cutting teeth.

Other features and advantages of the invention will appear from the reading of the following description, reference being made to accompanying drawing the single figure of which illustrates in elevational view a saw according to my invention.

Said saw is provided with a rigid stirrup shaped member 1 on which are mounted bearings 2 and 3 for the rotary tool 4.

The operative edge of the rotary tool 4 is constituted by a series of individual abrading elements 5 of suitable material such as tungsten carbide or the like that are secured through soldering, welding or the like manner. According to a feature of the invention, said abrading elements 5 are arranged along two non-intersecting helical paths or sections 6 and 7 having equal lengths and equal and opposite pitches. In other words, the section 6 has a left hand pitch, for instance, and the section 7 a right hand pitch.

The rotary tool 4 is rotated by an electric motor 8, preferably coupled directly to it. The system may be carried by two handles 9 arranged to either side of the stirrup 1.

The above-described saw operates as follows: the tool 4 is rotated in the direction of the arrow 10 through the agency of the motor 8. The saw is laid through the agency of the handle 9 on the mass to be sawed. The rotation of the tool causes the abrading elements 5 to produce a cut throughout the length of the mass, which length should obviously be smaller than the length of the tool 4. By reason of the fact that the pitches of the two helical sections 6 and 7 are of opposite directions, the longitudinal thrust produced through the cutting of the stone is reduced to zero whereby no reaction is felt by the workman holding the saw.

On the other hand, when the tool 4 rotates in a suitable direction the waste or stone fragments are removed from the associated cuts outwardly through the very movement of one of the helical sections that form thus at the same time transportation means.

In order to further the operation of the rotary tool 4, the workman who controls the setting of the saw by means of the handles 9 may give the saw a reciprocating movement directed axially of the tool 4.

Of course, the embodiment described hereinabove and illustrated in the drawing is disclosed by way of a mere example and by no means in a limiting sense and obviously it is possible to modify in any suitable manner the shape, nature, arrangement and manner of mounting its elements without unduly widening the scope of the invention as defined in accompanying claims.

Thus the motor 8 illustrated may be replaced by a drive including a flexible transmission controlled by a stationary motor on the outside of the tool. Furthermore instead of being constituted by separate members, the operative edge of the rotary tool 4 may be continuous and may be produced by the direct machining of said tool.

What I claim is:

1. A saw comprising, in combination, a support; a spindle mounted on said support for rotation about its axis, said spindle having two opposite ends; means connected to said spindle for rotating the same; and two sets of cutting teeth on said spindle, one of said sets of cutting teeth extending from an intermediate portion of said spindle toward one of said ends thereof along a right-hand helical line, and the other of said sets of cutting teeth extending from said intermediate portion of said spindle toward the other of said ends thereof along a left-hand helical line.

2. A saw comprising, in combination, a support; a spindle mounted on said support for rotation about its axis, said spindle having two opposite ends; means connected to said spindle for rotating the same; and two sets of cutting teeth on said spindle, the said two sets of cutting teeth being arranged along said spindle in two non-intersecting lines respectively extending from an intermediate point on said spindle towards said opposite ends thereof, one of said lines of cutting teeth being a right-hand helix and the other of said lines of cutting teeth being a left-hand helix.

3. A saw comprising, in combination, a support; a spindle mounted on said support for rotation about its axis, said spindle having two opposite ends; means connected to said spindle for rotating the same; and two sets of cutting teeth on said spindle, one of said sets of cutting teeth extending from an intermediate portion of said spindle toward one of said ends thereof along a right-hand helical line, and the other of said sets of cutting teeth extending from said intermediate portion of said spindle toward the other of said ends thereof along a left-hand helical line, said two helical lines of cutting teeth having substantially the same lead.

4. A saw comprising, in combination, a support; a spindle mounted on said support for rotation about its axis, said spindle having two opposite ends; means connected to said spindle for rotating the same; and two sets of cutting teeth on said spindle, one of said sets of cutting teeth extending from an intermediate portion of said spindle toward one of said ends thereof along a right-hand helical line, and other of said sets of cutting teeth extending from said intermediate portion of said spindle toward the other of said ends thereof along a left-hand helical line, said two helical lines of cutting teeth having substantially the same lead and being of substantially the same length.

5. A saw comprising, in combination, a support; a spindle mounted on said support for rotation about its axis, said spindle having two opposite ends; means connected to said spindle for rotating the same; and two sets of cutting teeth on said spindle, one of said sets of cutting teeth extending from an intermediate portion of said spindle substantially up to one of said ends thereof along a right-hand helical line, and other of said sets of cutting teeth extending from said intermediate portion of said spindle substantially up to the other of said ends thereof along a left-hand helical line, said two helical lines of cutting teeth having substantially the same lead and being of substantially the same length.

6. A saw comprising, in combination, a support; a spindle mounted on said support for rotation about its axis, said spindle having two opposite ends; means connected to said spindle for rotating the same; and two sets of cutting teeth on said spindle, one of said sets of cutting teeth extending from a substantially central point of said spindle substantially up to one of said ends thereof along a right-hand helical line, and other of said sets of cutting teeth extending from said substantially central point of said spindle substantially up to the other of said ends thereof along a left-hand helical line, said two helical lines of cutting teeth having substantially the same lead and being of substantially the same length.

7. A portable saw comprising, in combination, a substantially U-shaped support having a pair of legs with outer end portions, respectively; a pair of bearings respectively mounted in said outer end portions of said legs; a spindle having a pair of opposite end portions respectively mounted for rotation in said bearings, so that said spindle may rotate about its own axis; means connected to said spindle for rotating the same; a pair of handle means respectively connected to said end portions of said legs of said U-shaped support, so that said portable saw may be held by said handle means during the operation thereof; and two sets of cutting teeth on said spindle, said two sets of cutting teeth being respectively arranged along two non-intersecting lines both of which commence at a substantially central point of said spindle and respectively extend from said point up to said opposite end portions of said spindle which are respectively mounted in said bearings, one of said lines being a right-hand helix and the other of said lines being a left-hand helix, and the said two helical lines of cutting teeth each having substantially the same lead and being of substantially the same length, whereby when the saw is operated with said spindle centrally located in a piece of material to be cut, the two helical lines of cutting teeth will produce opposite thrusts so that the operator may easily hold the saw against the material and said two lines of cutting teeth will carry the cut away material out toward the opposite end portions of the saw spindle.

PAUL MARCEROU.

REFERENCES CITED

The following references are of record in the file of this patent:

UNITED STATES PATENTS

| Number | Name | Date |
|---|---|---|
| 125,804 | Gear | Apr. 16, 1872 |
| 172,517 | Steinbeck | Jan. 18, 1876 |

FOREIGN PATENTS

| Number | Country | Date |
|---|---|---|
| 294,860 | France | Dec. 1, 1891 |